(12) United States Patent
L'Heureux et al.

(10) Patent No.: US 7,996,882 B2
(45) Date of Patent: Aug. 9, 2011

(54) DIGITAL ASSET DISTRIBUTION SYSTEM

(76) Inventors: Israel L'Heureux, Atherton, CA (US); Christopher J. Peiffer, Los Angeles, CA (US)

( * ) Notice: Subject to any disclaimer, the term of this patent is extended or adjusted under 35 U.S.C. 154(b) by 859 days.

(21) Appl. No.: 11/678,731

(22) Filed: Feb. 26, 2007

(65) Prior Publication Data

US 2008/0209514 A1 Aug. 28, 2008

(51) Int. Cl.
*H04L 29/06* (2006.01)
(52) U.S. Cl. ............................................................ 726/4
(58) Field of Classification Search .................. 713/168, 713/175, 189, 193; 726/21, 22, 24, 26; 705/50, 705/51, 71, 76, 26
See application file for complete search history.

(56) References Cited

U.S. PATENT DOCUMENTS

| | | | |
|---|---|---|---|
| 2005/0050218 A1* | 3/2005 | Sheldon | 709/231 |
| 2006/0053077 A1* | 3/2006 | Mourad et al. | 705/51 |
| 2007/0260627 A1* | 11/2007 | Knittel et al. | 707/101 |

* cited by examiner

*Primary Examiner* — Brandon S Hoffman
(74) *Attorney, Agent, or Firm* — Alleman Hall McCoy Russell & Tuttle LLP (57) ABSTRACT

Digital asset distribution systems and methods are provided. The method may include receiving a digital asset and associated permissions from each of a plurality of publishers, and hosting the digital assets received from each publisher on a digital asset server system. The method may further include receiving a request from a user to access a requested digital asset via the digital asset server system, determining whether the user is authorized to access the requested digital asset according to the permissions for the digital asset. If the user is not authorized, the method may include displaying a substitute to the user. The substitute may include a link to the digital asset server system by which the user may obtain authorization to download the digital asset.

21 Claims, 11 Drawing Sheets

DIGITAL ASSET DISTRIBUTION SYSTEM

BACKGROUND

Online file sharing systems have been developed, which enable users to share files over computer networks. For example, online video and photo sharing websites have been developed, which make it possible for users to upload video or photo files to a server, categorize the files by keywords, and offer the files to other users for search and viewing.

One example of an online video sharing website is YOUTUBE. This site enables users to upload video files, which are then converted to flash format for viewing by other users. If a video becomes popular, it may be viewed thousands, or even hundreds of thousands of times by users across the globe. YOUTUBE generates revenue by displaying advertisements on its site alongside these videos. Users who post videos, however, typically receive only notoriety as opposed to financial benefit. Users can assign keywords to their videos, which, in turn, may either increase or decrease their exposure when searched by keyword. Users can also publish their videos to a channel or friends list created by the poster, or to a group to which the poster belongs. Apart from limiting access to a friends list, however, users have virtually no control over who accesses their uploaded content once it is posted and indexed by keyword.

One example of an online photo sharing website is FLICKR, which enables users to post photos for viewing. This site enables a user to choose whether a photo is private, available on a friends list, or open to the public. In an attempt to govern downstream use of the photos, users are provided the option of applying one of several CREATIVE COMMONS licenses to their uploaded photographs. CREATIVE COMMONS licenses govern attribution, modification of the licensed asset, use for commercial purposes, etc. CREATIVE COMMONS licenses do not provide that license fees can be paid from the licensee to the licensor. Thus, these licenses are not designed to enable content creators to profit from their creative works. FLICKR does not offer other licenses, and does not permit the user to alter the terms of the CREATIVE COMMONS license. Further, FLICKR does not have any method for enforcing the terms of the CREATIVE COMMONS license. Thus, even if a user who posts content on the site specifies that the CREATIVE COMMONS license applies to the posted content, it is up to the user to police the marketplace to determine if any infringement occurs. As a result, in spite of the CREATIVE COMMONS license option, FLICKR, like YOUTUBE, does not offer the user any control over who accesses the uploaded content, apart from a friends list. Also, like YOUTUBE, FLICKR generates revenue by displaying advertisements on its site next to its photos. The users who post photos, however, typically receive only notoriety as opposed to financial benefit.

GETTYIMAGES and CORBIS operate websites, which offer images obtained by an assortment of photographers for download under a variety of licensing options. Neither website, however, provides a mechanism for users to upload photographs, assign licensing conditions at the user's discretion, or make those photographs available for users to browse. Rather, the licensing and pricing of the images is controlled by the website operator itself. Therefore, users are unable to freely distribute their images according to their own pricing policies.

The inventors herein have recognized that none of the currently available file sharing technologies provides a mechanism that enables users to suitably profit from the distribution of their digital works.

SUMMARY

A digital asset distribution method is provided. The method may include receiving a digital asset and associated permissions from each of a plurality of publishers, and hosting the digital assets received from each publisher on a digital asset server system. The method may further include receiving a request from a user to access a requested digital asset via the digital asset server system, determining whether the user is authorized to access the requested digital asset according to the permissions for the digital asset. If the user is not authorized, the method may include displaying a substitute to the user. The substitute may include a link to the digital asset server system by which the user may obtain authorization to download the digital asset.

DETAILED DESCRIPTION

Figure 1:
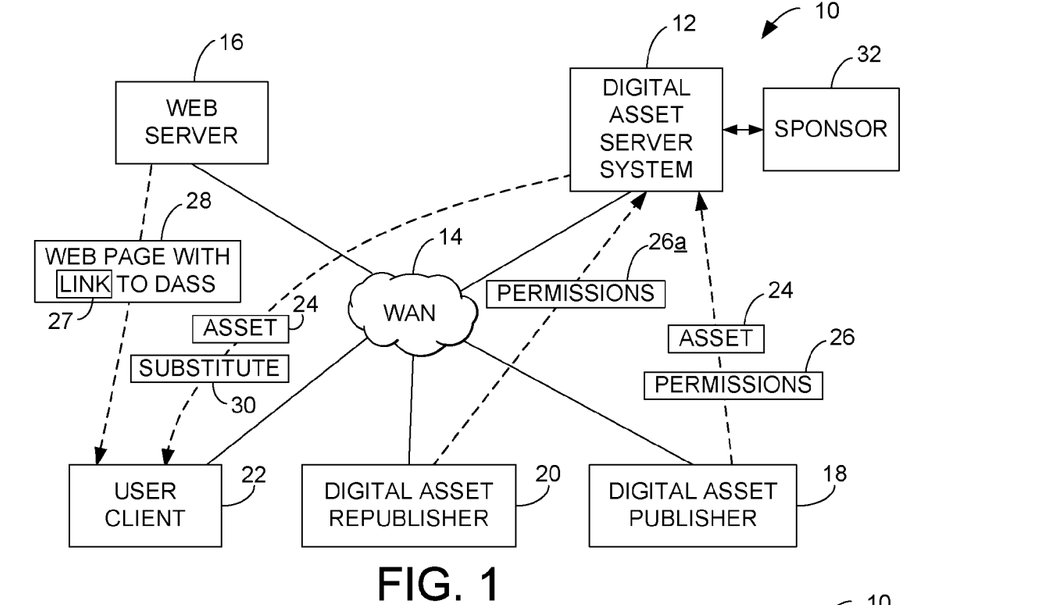
FIG. 1 is a schematic view of an embodiment of a distribution system for digital assets.

FIG. 1 illustrates a digital asset distribution system 10, including a digital asset server system (DASS) 12 linked via a wide area network, such as the Internet, to a web server 16, digital asset publisher 18 and republisher 20, and a user client 22. Digital asset server system 12 is configured to receive a digital asset 24 and associated permissions 26 from each of a plurality of publishers 18, and, in turn, host the digital assets received from each publisher for purchase and download by user client 22. It will be appreciated that the permissions uploaded with the digital asset from the publisher to the digital asset server system 12, typically include pricing and redistribution rights.

User client 22 is configured to download from web server 16 a webpage including a link to the digital asset server system 12. The user client 22, in turn, traverses the link, sending a request to the digital asset server system 12 to download a digital asset 24. The server system receives the request from the user client 22 to access the requested digital asset and determine whether the user client 22 is authorized to access the requested digital asset according to the permissions 26 for the digital asset 24. If the user is not authorized, the digital asset server system 12 will send a substitute 30 to the user, which includes a link to the digital asset server system 12 by which the user may obtain authorization to download the digital asset 24. If the user is authorized, the digital asset server system 12 will serve the requested digital asset to the user client for presentation by displaying or playing through speakers on the user client. It will be appreciated that the URL of the link for the digital asset 24 and substitute 30 is typically the same, and the response of the digital asset server varies between the substitute and the asset based on the outcome of permission at the server system.

The digital asset server system 12 is configured to enable parties to republish digital assets that they own, if republication is authorized by the original publisher of the digital asset 24. The republisher may specify republisher permissions 26a, which govern how the digital asset 24 is republished.

Typically, web server 16 is operated by a third party, and the link is embedded in a web page of website of the third party. Alternatively, web server 16 may be operated by the operator of digital asset server system 12, or by the publisher 18 or republisher 20. For example, the web server 16 may be a digital asset marketplace website operated by the digital asset server system operator, by which users may browse assets for sale by a variety of publishers. Examples of publisher or republisher websites include a music distribution website operated by a music publisher, or art gallery website operated by an artist.

The digital asset server system 12 is further configured to communicate with a sponsor client 32, and receive digital asset sponsorships from the sponsor client 32. For sponsored assets, the user may purchase an asset for a lower price, receive the asset in exchange for an action or series of actions by the user, or receive the asset for free, as detailed below.

Figure 2:
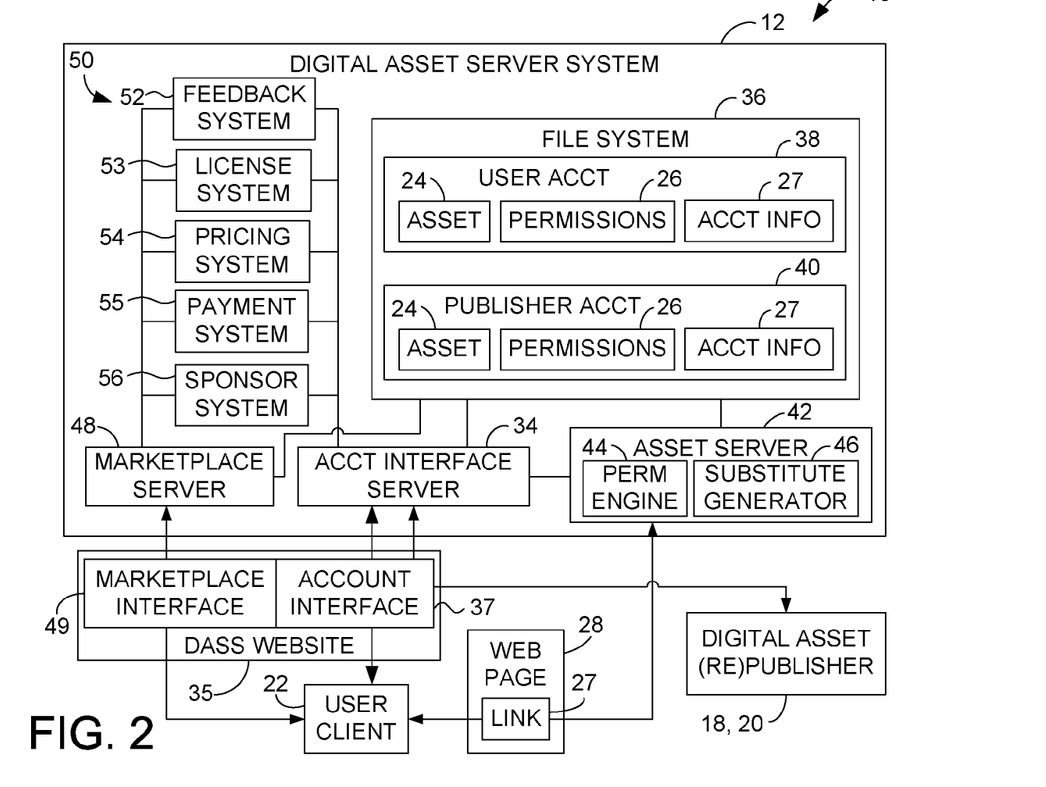
FIG. 2 is another schematic view of the distribution system of FIG. 1, illustrating internal details of a digital asset server system of the distribution system.

As shown in FIG. 2, users and publishers may interact with the digital asset server system 12 in different ways. For example, users may access a digital asset server system website 35, or a third party through a link 27 on a third party web page 28.

The digital asset server system 12 includes an asset server 42, configured to receive requests for digital assets, and, in turn, serve the requested digital assets when the requesting user is authorized and serve a substitute when the use is not authorized. The asset server 42 includes a permissions engine 44, configured to determine whether users from whom requests are received are authorized to download a requested digital asset. The asset server 42 also includes a substitute generator 46 configured to generate substitute 30, which is served to the requesting user if the user is not authorized to download the requested digital asset.

The digital asset server system 12 further includes an account interface server 34, configured to serve an account interface 37, which forms a portion of the digital asset server website 35. Via the account interface 37, a registered user 22 or publisher/republisher 18, 20 may interact with a user account 38 or publisher/republisher account 40 stored on file system 36.

The digital asset server system 12 further includes a marketplace server 48, configured to serve a marketplace interface 49, which forms another portion of the digital asset server system website 35. The marketplace interface 49 enables users to browse and purchase assets 24, stored on the digital asset server system 12.

The marketplace server 49 is supported by a plurality of functional software modules 50, which may be back end application servers in and of themselves. These include a feedback system 52 by which users may place comments, ratings, and other user feedback for each asset on the digital asset server system, as described in detail below. A license system 53 may be provided for users to set the licensing parameters, i.e., permissions 26, associated with each asset 24. A pricing system 54 may be provided to enable a user to set the price, or may be configured to assist a user in suggesting or otherwise automatically generating a price for the digital assets 24. A payment system 55 may be provided to enable users to pay for assets. Finally, a sponsor system 56 may also be included by which third party sponsors may pay for digital assets that are transmitted to users as a form of sponsorship advertising. The function of these various modules 50 is described below in additional detail.

Figure 3:
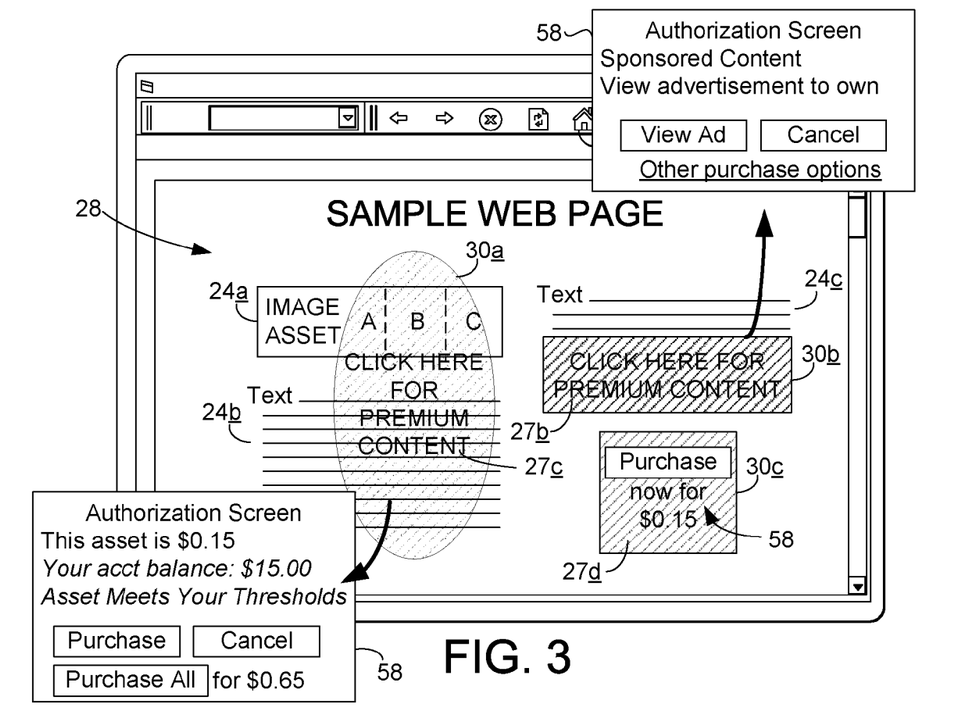
FIG. 3 is a schematic view of a sample web page generated by the distribution system of FIG. 1, the sample web page containing substitutes covering part or all of a collection of digital assets.
Figure 4:
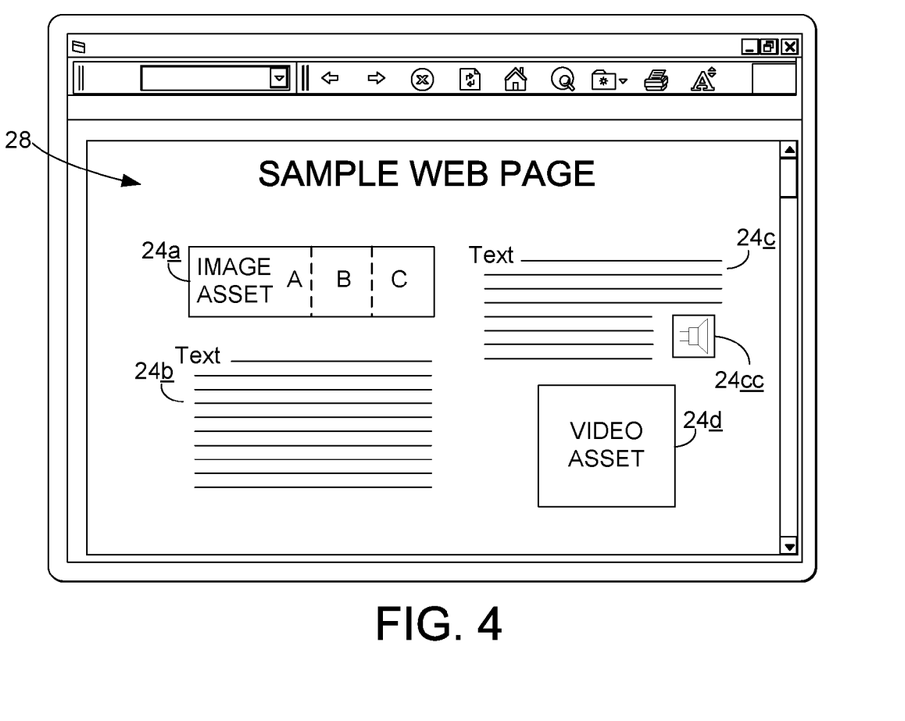
FIG. 4 is a schematic view of the sample web page of FIG. 3, with the substitutes removed.

FIGS. 3 and 4 show a sample web page 28 with a plurality of digital assets, including a compound image asset 24a, a first text asset 24b, a compound text and sound asset 24c, and a video asset 24d. It will be appreciated that the digital assets described herein may be comprised of individual files, such as first text asset 24b, video asset 24d, or a collection comprised of a plurality of individual files, such as compound image asset 24a formed of individual image files represented as A, B, and C, or compound text and sound asset formed of a text file and associated sound file activated by sound icon 24cc.

FIG. 3 depicts the web page 28 as it might be served by the digital asset server system to a user who does not have sufficient permissions to fully view the digital assets. The substitute may be sized to be substantially the same size as the digital asset, as in the case of substitute 30c, or alternatively may be smaller or larger to partially or fully block display of the asset. In this case, access to the digital assets is either partially or entirely blocked by the display of a substitute 30a-30c, all or portion of which may be wholly or partially translucent. Substitute 30a is translucent and is shown covering a portion of two digital assets 24a and 24b. Substitute 30b is opaque, and is shown covering a portion of digital asset 24c. Substitute 30c is opaque and is shown completely occluding display of video asset 24d. Links 27a-27c are provided as a mechanism to download the asset or assets that are occluded by the substitute 30c. Once the user is authorized to view the asset, the substitute 30c is removed to reveal the asset.

Where the digital asset is partially visible to the user, the digital asset server may be configured to transmit the digital asset to the user client 22 prior to, or contemporaneously with, the substitute 30. When the digital asset 24 is not partially visible, but rather only the substitute 30 is visible, the digital asset server system 12 may be configured to transmit the digital asset 24 to the user client only after the substitute 30 is transmitted to the user client. As yet another alternative, the digital asset server system 12 may be configured to transmit the digital asset 24 to the user client 22 prior to or contemporaneously with the substitute 30, and browser side executable instructions, e.g. JAVASCRIPT®, may be configured to delay the display of the digital asset 24 to the user client 22 until after the appropriate permissions are obtained from the digital asset server system 12.

Figure 5:
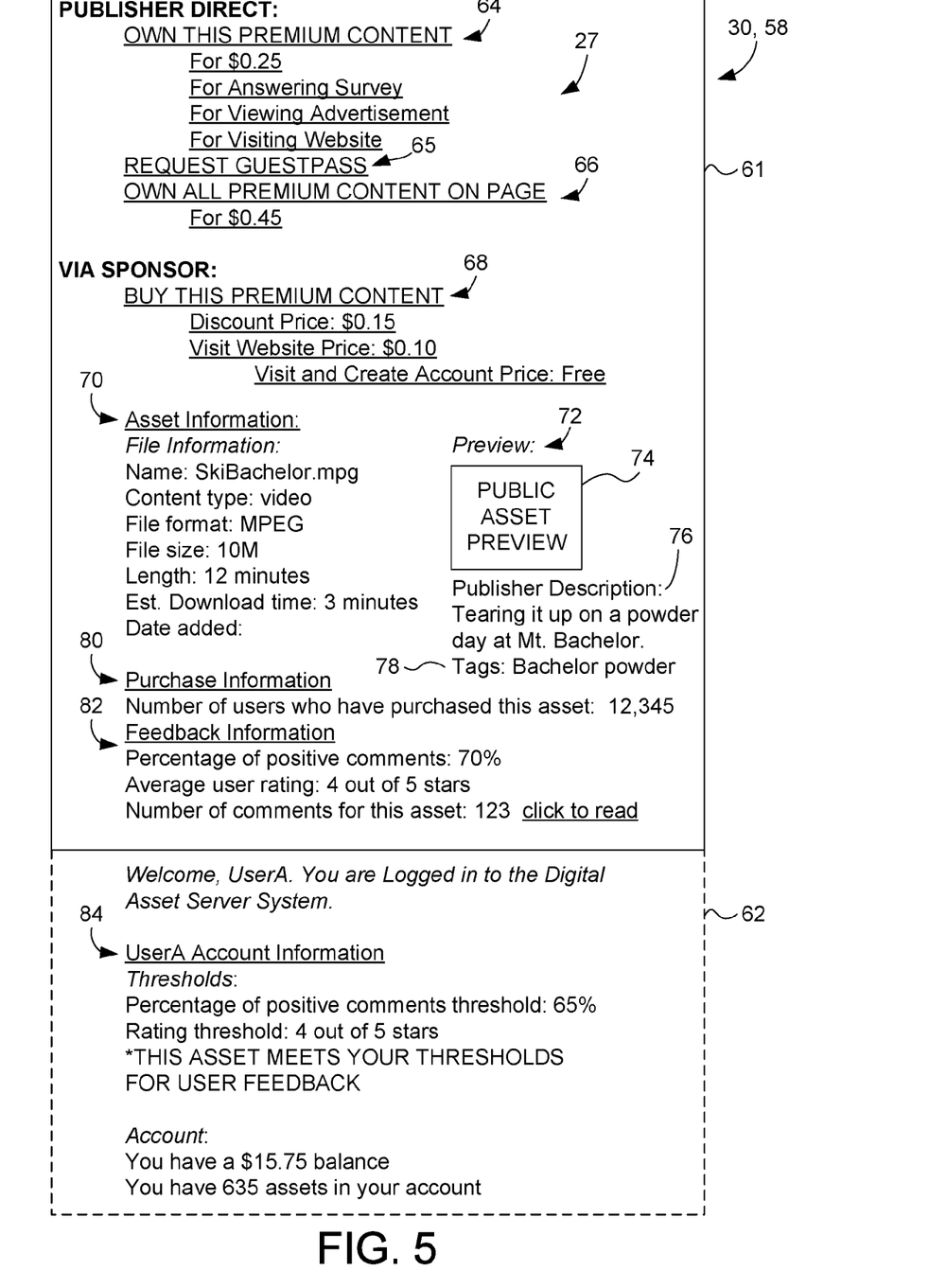
FIG. 5 is a detailed schematic view of another embodiment of a substitute, such as featured in FIGS. 3 and 4.

Clicking on the link provided in each substitute may cause the display of an authorization interface 58, by which the user may purchase the asset. Two examples of pop-up authorization interfaces 58, which may be accessed by clicking or mousing over respective substitutes, are illustrated in FIG. 3. Alternatively, the authorization interface may be accessible via a separate web page, as illustrated in FIG. 5. As an additional alternative, the authorization interface may be embedded within the substitute itself, as shown at 27d. The authorization interface may be configured to enable the user to purchase the asset for money, as shown at 58, or to purchase the asset in exchange for a desired action, such as viewing an advertisement, as described in more detail with reference to FIG. 5. Further, the authorization interface may include asset information, such as the price of the asset, as well as user account information, if the user is logged in to the digital asset server system 12. The account interfaces of FIG. 3 are limited in space and contain an abbreviated set of information regarding the asset and user account. However, it should be appreciated that any of the pieces of information illustrated or described as being included within the authorization interface of FIG. 5 may be alternatively included within the pop-up account interface of FIG. 3.

FIG. 5 illustrates a substitute 30 and/or authorization interface 58, having a public portion 61 that is viewable to a user who is not logged in to the digital asset server system 12, as well as a private portion 62 that is typically viewable only to those users who are logged into the digital asset server system 12. The public portion 61 typically includes a plurality of different categories of links 27 to digital assets, including publisher direct links and sponsor links, which respectively enable a user to purchase digital assets from the publisher and or obtain the digital assets through sponsorship. Some of the links include pricing information for the asset, while other links include actions that must be undertaken to purchase the asset. This pricing and action information may also or in the alternative be displayed elsewhere within the substitute and/or authorization interface.

The links may further include an asset purchase link 64, a guestpass request link 65, and a purchase all link 66 configured to enable a user to purchase all assets displayed on a web page. The purchase all link 66 may include a plurality of purchase options, such as varying types of consideration the user can offer for the asset, including a price, answering a survey, viewing an advertisement, or visiting a website. Thus, it will be appreciated that the user may also perform an action designated by the publisher as an alternative to paying a monetary price for the asset. Further, as illustrated by the sponsor link 68, a plurality of prices may be offered based on the level of activity the user performs. For example, the user may pay $0.15 for the asset under the sponsor discount price. Alternatively, the user first performs a designated action (visiting the sponsor's website) for a first price ($0.10), and may perform a second designated action (creating an account at the sponsor website) for a second price (free).

The substitute 30 and/or authorization interface 58 may include asset information 70, which may include file information such as file name, content type, file format, file size, play length, estimated download time, and date added to the asset bar system, etc. The substitute 30 and/or authorization interface 58 may further include a preview 72 of the asset, including a preview image or video clip 74, as well as a publisher description 76 of the asset, which may include tag words used to index the asset in a database. It will be appreciated that preview 72 is typically a public preview available to those users who have not yet purchased the asset. It will also be appreciated that preview 72 may be customized based on the profile of the user. For example, users who own assets with matching tags as the asset viewed, may be regarded as more likely customers, and thus may be shown a preview that includes more details. Similarly, user's whose language is indicated as "Japanese" may be shown a Japanese textual description. Further, the publisher of an asset may specify different previews for different specified users or groups, thus customizing the manner in which users and groups are enticed to purchase the asset. For example, a user may specify that the video of a sporting match between Team A and Team B, include different previews for the members of Team A and Team B, with the Team A preview featuring an image of a memorable play by a Team member, and the Team B preview featuring a memorable play by a Team B member. In this way both teams may be better enticed to purchase the same video.

In addition, substitute 30 and/or authorization interface 58 may include purchase statistics 80 and user feedback information 82, including the number of times the asset has been purchased by other users, the number of user comments, percentage of positive or negative feedback, and average user ratings, on a standardized scale of, for example, one to five stars. The depicted embodiment also includes a link to read the text of the user comments. Alternatively, all or a portion of the text of the user comments could be displayed within the authorization interface 58.

The private portion 62 of the substitute 30 and/or authorization interface 58 may be configured to display user account information 84, which may include a user account balance, a number of digital assets in the user's account, and information on one or more preset rating thresholds that are set by the user, or other selection criteria set by the user. The private portion 62 may also include an indication of whether the asset meets preset rating threshold and other criteria set by the user. In the depicted embodiment, the rating threshold has been set to four stars, and a 65% positive feedback by the user, and a message is displayed indicating that this asset meets the user's rating thresholds.

Upon choosing an option to purchase an asset for money, the payment system typically negotiates and receives payment from the user for access to the digital asset. As discussed above, the publisher of the digital asset may be a republisher of the asset who owns the right to republish the asset. In such a circumstance, a portion of the payment received for the digital asset from the user may be distributed to the republisher, and a portion may be distributed to the publisher of the digital asset.

Figure 6:
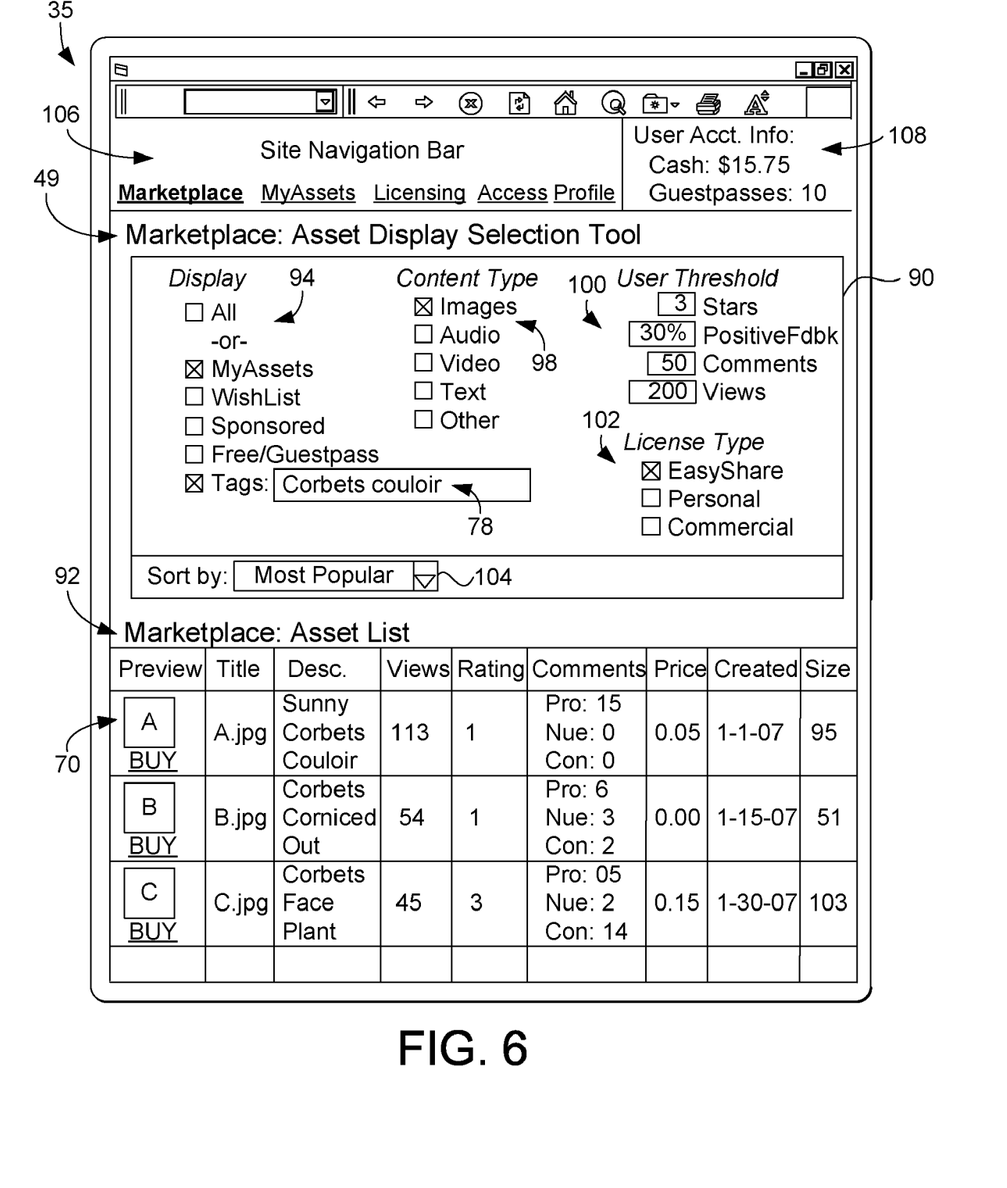
FIG. 6 is a schematic illustration of a webpage of a marketplace website served by the distribution system of FIG. 1.

FIG. 6 illustrates one embodiment of a market interface 49 of the digital asset server system website 35, served by the marketplace server 48 of digital asset server system 12. Market interface 49 typically includes an asset display selection tool 90, configured to receive a user selection of parameters of assets to display in an asset list 92. The selection tool 90 may include a display selector 94 for selecting either all assets available on the digital asset server system 12, or alternatively, a subset of those assets, which are owned by the user (MyAssets), stored in a user defined asset wishlist, sponsored by a sponsor 32, available for access with a guestpass, and/or indexed by one or more tags (i.e., keywords) 78. Selection tool 90 further includes a content type selector 98, configured to enable a user to filter the display results by content type, such as images, audio, text, video, or other content type. Selection tool 90 also typically includes a user threshold selector 100, configured to receive user input to filter out digital assets that do not meet user specified thresholds, such as user ratings (e.g., so-called star ratings), positive feedback, number of comments on the asset, or number of views the asset has received by users accessing the asset through the digital asset server system 12. Selection tool 90 may further include a license type selector 102, configured to receive user input to filter out assets that are not offered by their publishers according to a specified license type, such as an EASY- SHARE™ license, a personal license, and/or a commercial license. A sort selector may also be provided to sort the asset list 92 by a sort parameter, such as most popular, most positive feedback, most views, highest user rating (most stars), most recently added, asset size, or other suitable sort parameter.

Asset list 92 is generated by user selections input via selection tool 90. As is illustrated, asset list 92 typically includes, for each asset, asset information 70, such as an asset preview, asset title, asset description, views, ratings, number of comments, price, creation date, and file size.

A navigation bar 106 is provided on the digital asset server system website 35, to enable a user to navigate between different pages of the website. A user account summary pane may also be provided in which user account information, such as a monetary balance, a number of available guestpasses, etc. may be displayed.

Figure 7:
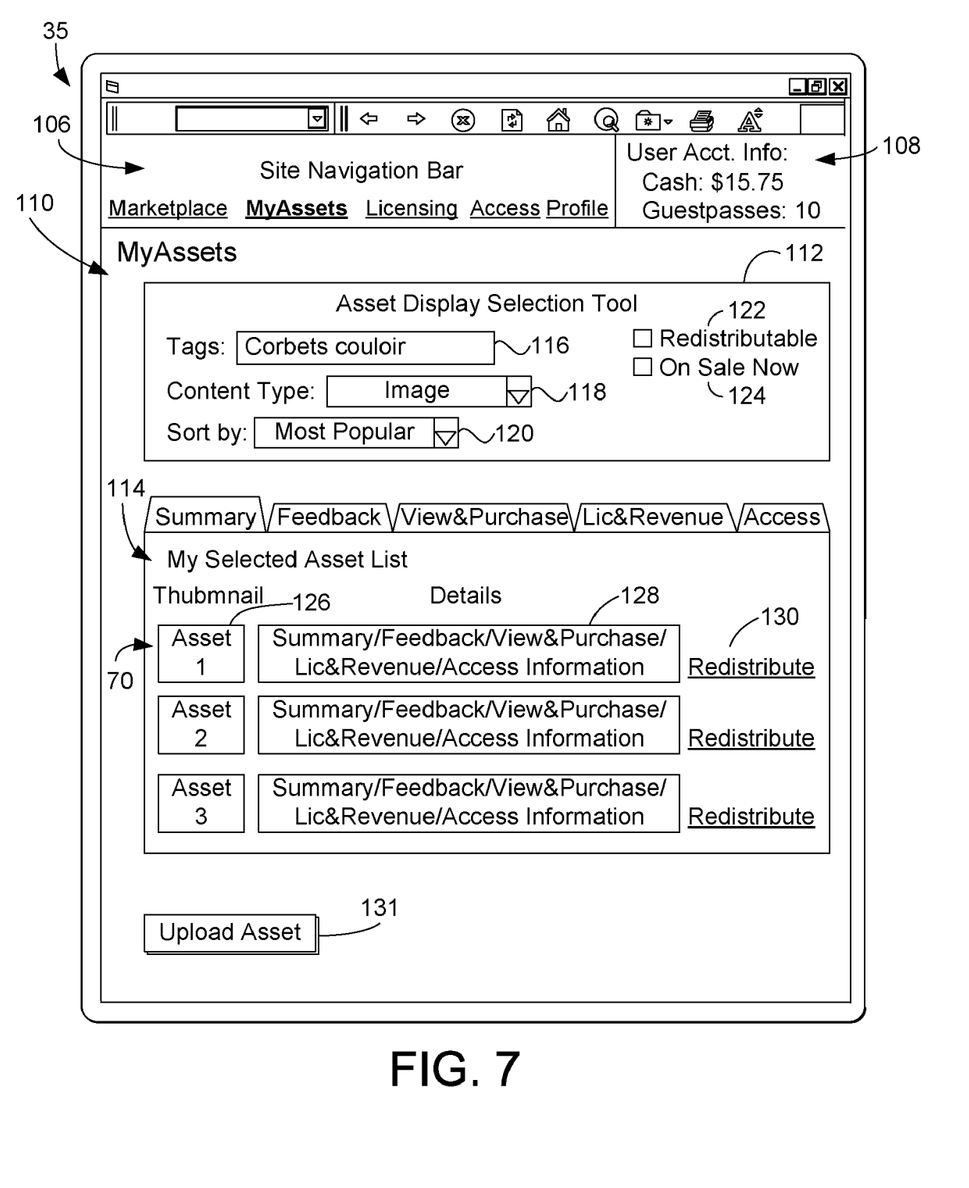
FIG. 7 is a schematic illustration of a user asset interface served by the distribution system of FIG. 1.

As shown in FIG. 7, the account interface of the digital asset server system website 35 typically further includes a user assets interface 110, including an asset display selection tool 112 by which users may input selection parameters according to which an asset list 114 of digital assets 24 is displayed. The asset list selection tool 112 typically acts as a filter, such that if no selections are made by the user, then all assets stored in the user account are displayed in the asset list 114. Typically these assets have been acquired by the user through purchase (for money or a user action), use of guestpasses, or via free distribution from the publisher.

The asset display selection tool 112 may include a tag selector 116 configured to receive user input of search tags, a content type selector 118 configured to receive user input of a desired content type to display, a sort tool 120 configured to receive user input to determine the sort order of the asset list, a redistributable selector 122 configured to receive user input to display only redistributable assets, and an on-sale-now selector 124 configured to receive user input to display those assets that are on sale by the user. The asset list 114 is constructed according to the user input received via the asset display selection tool 112.

The asset list 114 typically includes, for each asset, an assortment of asset information 70, including a thumbnail image 126 representing the asset, and tailored asset information 128. The thumbnail image of the asset may be different from the public preview 74 of the asset appearing in FIG. 5, and may be referred to as an owner's preview of the asset. The tailored asset information 128 is selected via a plurality of tabs or other selectors adjacent the asset list 114. By way of example, the tabs and corresponding tailored information 128 may include a summary tab configured to cause display of asset summary information such as title, file size, etc., a feedback tab configured to display user feedback (comments, ratings, positive/negative feedback, etc.) associated with the asset, a view and purchase tab configured to display the number of times the asset has been viewed, as well as the number of times the asset has been purchased by users, a licensing and revenue tab configured to display information on assets that are available for redistribution by the user and a summary of revenue generated by each asset, and an access tab configured to display access control settings for each asset. In addition, a redistribution link 130 may be provided adjacent each asset, to enable the user license the asset to third parties.

The user assets interface 110 also typically includes an upload asset selector 131, configured to enable a user to upload new digital assets to the user account on the digital asset server system 12.

Figure 8:
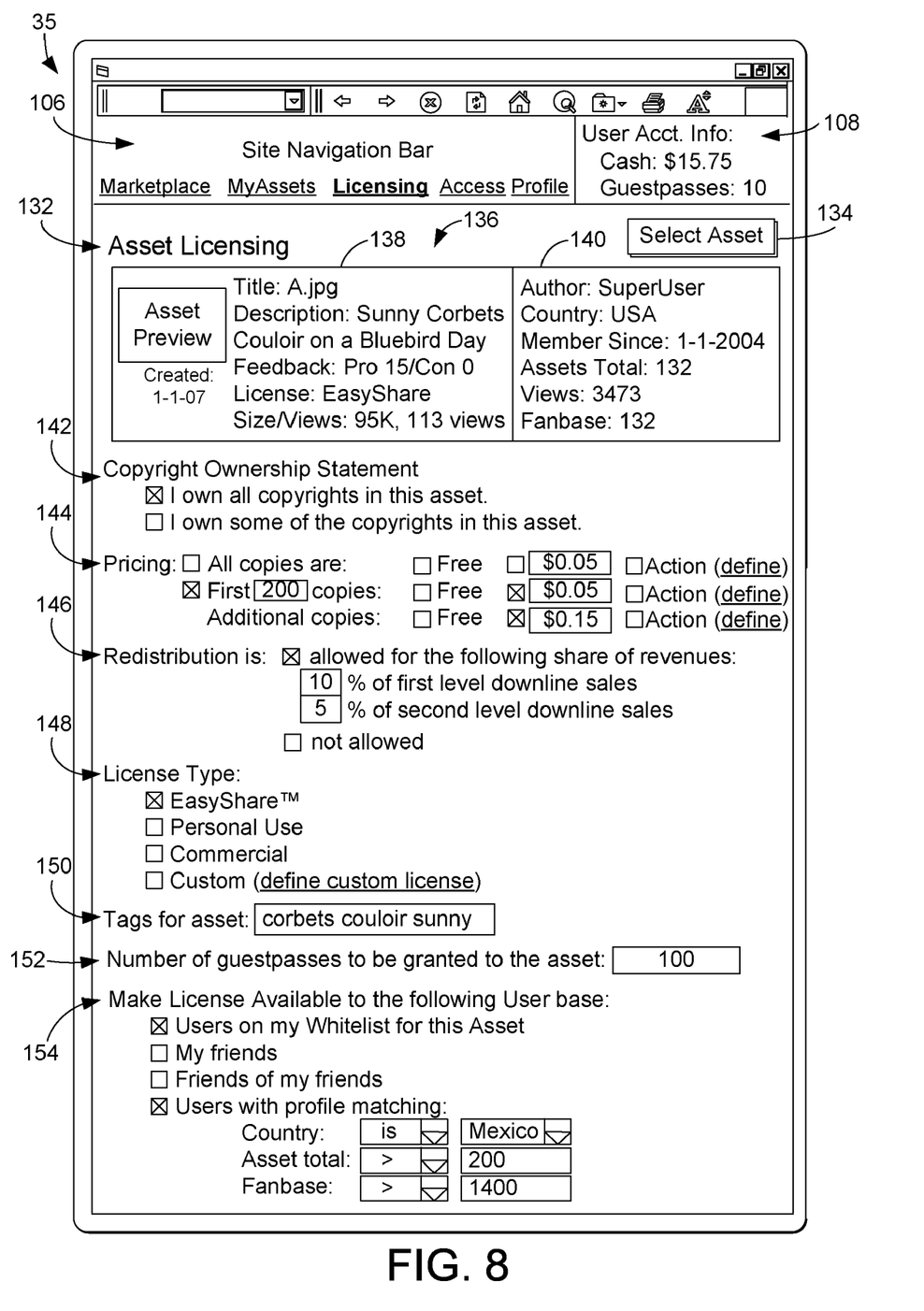
FIG. 8 is a schematic illustration of a licensing interface served by the distribution system of FIG. 1.

FIG. 8 shows one example of a licensing interface 132 in the form of a web page that may be accessed by traversing the redistribution link 130, or alternatively by traversing a licensing link in the navigation bar 106. Licensing interface 132 typically includes an asset selector button 134, which may bring up a pop up asset selector window by which the user may identify an asset to be licensed. The asset selector button 134 is configured to enable selection of a new asset for uploading to the digital asset server system 12, as well as an existing asset stored in the user account. The licensing interface also includes an asset summary pane 136, including a asset information portion 138 configured to display asset information, such as an asset preview, creation date, title, description, feedback, licensing, and size and views information. The asset summary pane 136 also typically includes an author summary portion 140, configured to display information on the author of the selected digital asset, user name, country, member since date, total assets in portfolio, total views of all assets, and the number of users who have registered on the author's fanbase.

The licensing interface 132 further includes a copyright ownership statement 142, by which the user indicates whether the user owns all rights or some of the rights of the copyright; that is, whether the selected asset for licensing is a derivative work based on another author's original work or an original work by the user, not based on any other work.

The licensing interface 132 further includes a pricing selector 144, configured to receive user input of pricing parameters for the digital asset. The pricing selector may further include an all price selector for selecting a price for all copies of the asset, as well as a tiered pricing selector for selecting an initial price for a selected number of copies for a first-time user, and a second price for additional copies. The all price and tiered price selectors may include as selection options a "free" price, a monetary amount, or a user-defined action required of the purchaser. A "define" link is provided by which the licensing user may access an interface to specify the purchaser's action. The action may be, for example, filling out a survey, viewing an advertisement, visiting a website, visiting a website or creating a user account, etc., as described with reference to FIG. 5.

The licensing interface 132 also includes a redistribution selector 146, by which the licensing user may specify whether redistribution by third parties is allowed or not allowed. If redistribution is allowed, the user may specify respective percentages of revenues required to be paid to the licensee for first level downline sales and second level downline sales. First-level downline sales are sales by users who have directly purchased from the licensee. Second-level downline sales are sales by users who obtained the asset via a first-level downline purchase, rather than directly from the licensee.

The licensing interface 132 also includes a license selector 148, by which a user may choose from one of several standardized licenses or select a customizable license template to specify the licensing terms for the asset. The licensing interface 132 also typically includes a tag input field 150 by which the user may input tags according to which the licensed asset will be indexed for searchable access by potential purchasers, via the marketplace interface.

The licensing interface 132 may further include a guestpass selector 152, according to which a user may specify a number of guestpasses to allow for the asset. Guestpass use may carry with it certain terms and conditions. For example, an asset licensed under a guestpass may be available in the user's account for a limited amount of time, or, on the other hand, only a portion of the content may be made accessible via the guestpass. Thus, obtaining an asset using a guestpass may be distinguished from obtaining an asset for a "free" price.

The licensing interface 132 may further include a license offer selector 154, configured to receive user input of the user base to which the subject digital asset should be offered for license. The license offer selector 154 may enable users to offer a license to members of a whitelist, members of a friends list, friends of friends, or users who have a user profile that matches a specified target user profile. While country, asset total, and fan base are three example profile parameters illustrated in FIG. 8, it will be appreciated that the license offer selector may be configured to receive a target value for virtually any suitable user profile parameter specified by the user.

The user input received via licensing interface 132 forms a set of licensing permissions, according to which the digital asset may be distributed via digital asset server system 12. Licensing permissions form a subset of permissions 26.

Figure 9:
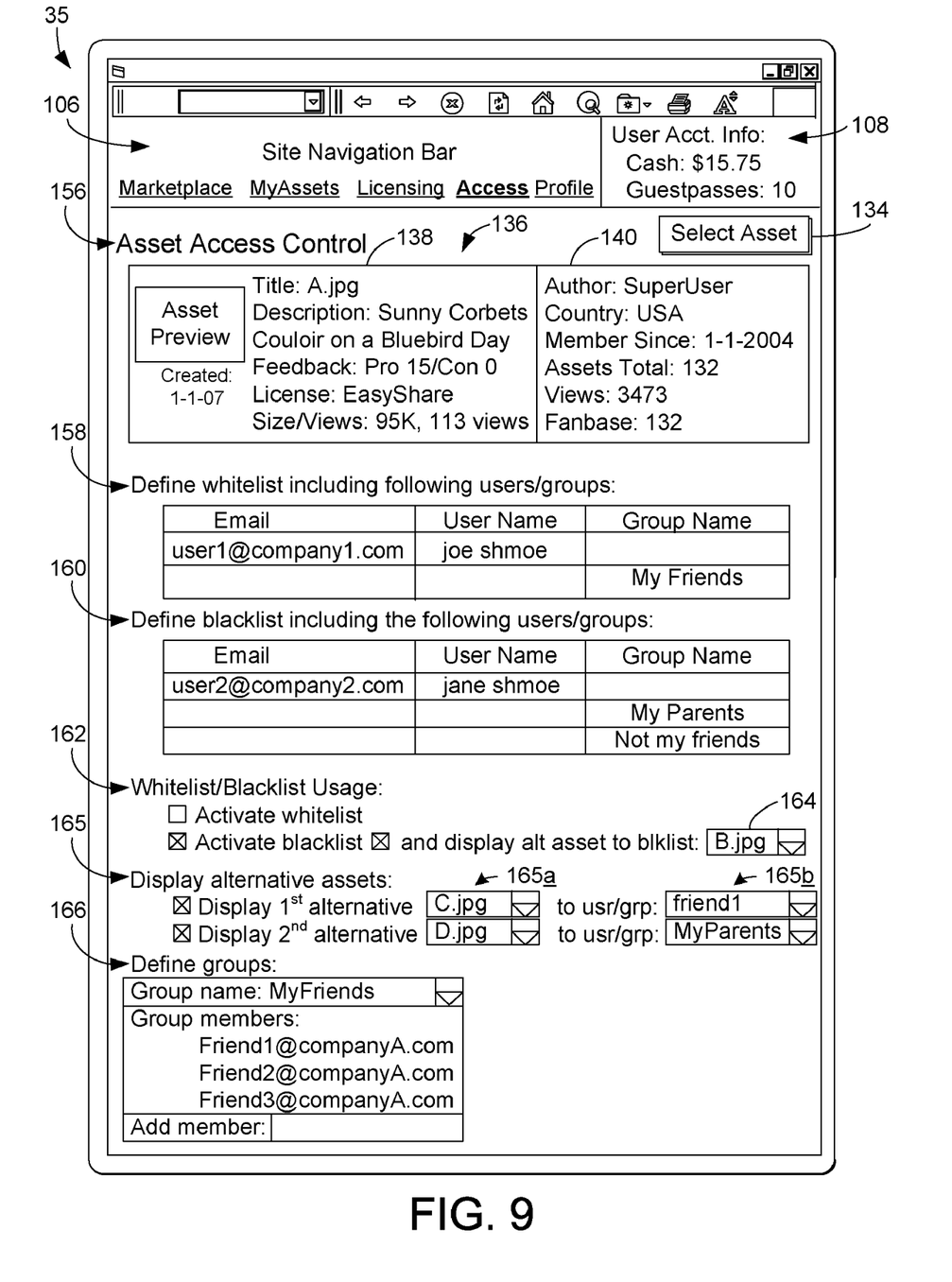
FIG. 9 is a schematic illustration of a user asset access control interface served by the distribution system of FIG. 1.

FIG. 9 illustrates an access control interface 156 of the digital asset server system 12. The access control interface may, for example, be displayed by traversing a link in the navigation bar 106. The access control interface 156 is configured to enable a user to input access parameters on an asset-by-asset basis, thereby controlling which users have access to view assets owned by the user. Access control interface 156 includes an asset selection tool 134, and asset summary pane 136 with asset information portion 138 and author information portion 140, as described above with reference to FIG. 8. Asset selection tool 134 enables a user to select a specific asset in the user's account for input of access control parameters, as well as an asset summary pane 136, which displays summary information about the asset.

Access control interface 156 further includes a whitelist input tool 158, configured to receive user input of a list of users and/or groups to include in the user's whitelist, as well as a blacklist input tool 160 configured to receive user input of a list of users and/or groups to include in the user's blacklist. As used herein, the term whitelist refers to a list of users to whom access or other specified functionality is always offered, and blacklist refers to a list of users to whom access or other specified functionality is never offered. In the depicted example, a user enters the email address, user name, or group name for each whitelist or blacklist entry. Alternatively, other suitable forms of input could be utilized.

Access control interface 156 further includes a whitelist/blacklist settings selector 162, which typically includes a mechanism configured to activate or deactivate each of the whitelists and blacklists, and a blacklist alternative asset selector 164 to receive user input of an alternate digital asset to be served to members of the blacklist who request the original asset. In addition, the access control interface 156 may further include a second alternative asset selector 165, configured to receive user input via alternative asset selectors 165a and user and group selectors 165b, of one or more users and/or groups, and an alternative asset to serve each specified user or group. This can be useful when, for example, instead of the subject asset (A.jpg, a picture of the famous ski run Corbet's Couloir), the user wants a first specified user/group, such as friend1, to see a first alternative asset, such as D.jpg, which might be a picture of an adventurous ski jump by the user, and a second specified user/group, such as MyParents, to see yet a different asset, such as E.jpg, which might be a picture of the user on a gentle ski slope, to calm any potential fears that parents may harbor.

Access control interface 156 further includes a group definition tool 166, configured to receive user input to define the individual members of one or more groups. The group definition tool includes a drop down menu tool to select an existing group, as well as a "new" option for defining a new group. A group display pane displays group members, while an add field is configured to receive input to add additional members to the group. Typically, the group MyFriends is standard, such that all users of the digital asset server system 12 have a MyFriends group defined as the default. Each user must populate their MyFriends group independently by using the group definition tool.

User input access control parameters received via access control interface 156 form a set of access control permissions, according to which digital access may be distributed via the digital asset server system 12. Like licensing permissions, access control permissions form another subset of permissions 26.

Figure 10:
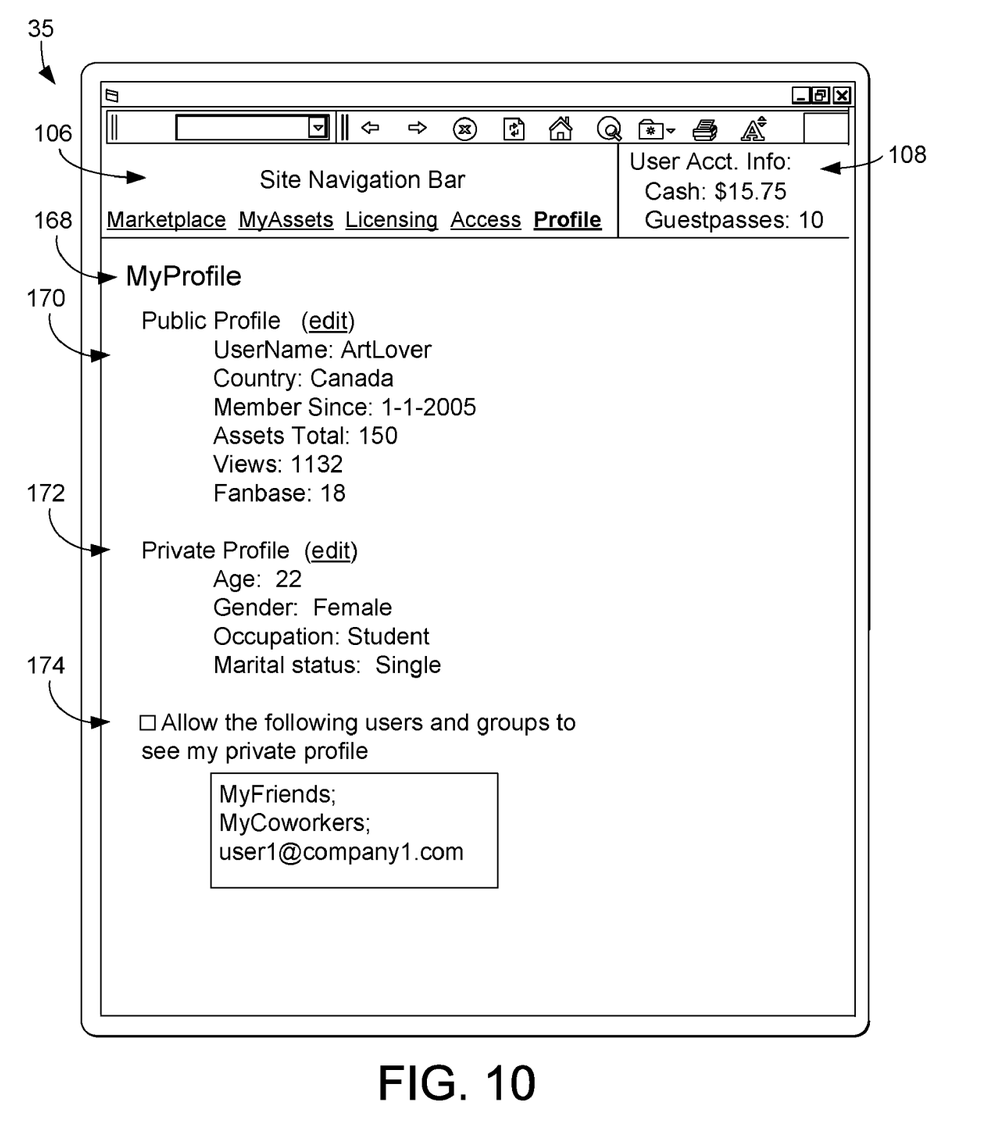
FIG. 10 is a schematic illustration of a user profile interface served by the distribution system of FIG. 1.

FIG. 10 illustrates a user profile interface 168 of the digital asset server system 12. The profile interface may be accessed by a profile link in navigation bar 106, and enables users to display and edit their profile. A user profile is typically divided into a public profile 170 that is viewable by all users of the digital asset server system 12, and a private profile 172 that is viewable only to those users specified by the user. A private profile viewing selector 174 is provided to receive user input of users and/or groups permitted to view the user's private profile. The user may select specific users and groups by name, or may alternatively select users and groups by profile attributes. For example, the user may select that all users whose profile attributes indicate "skiing" and "risk taking" as so-called likes, and "soap operas" as dislikes. In addition, a mechanism may be provided to select that if a threshold number of a total number of possible matches are made, then profile access is allowed. For example, if two out of three profile attributes are matched, then profile access is allowed. Finally, it will be appreciated that banned tags may be input by the user, such that if the system detects that a requesting user has a banned tag in their profile, then access is denied. For example, a user may specify that access is denied to all requesting users who have "chess" in their profiles. In this way, a user need not know the name or identity of other users who are allowed access. Rather the user merely needs to specify the profile attributes of the other users.

Figure 11:
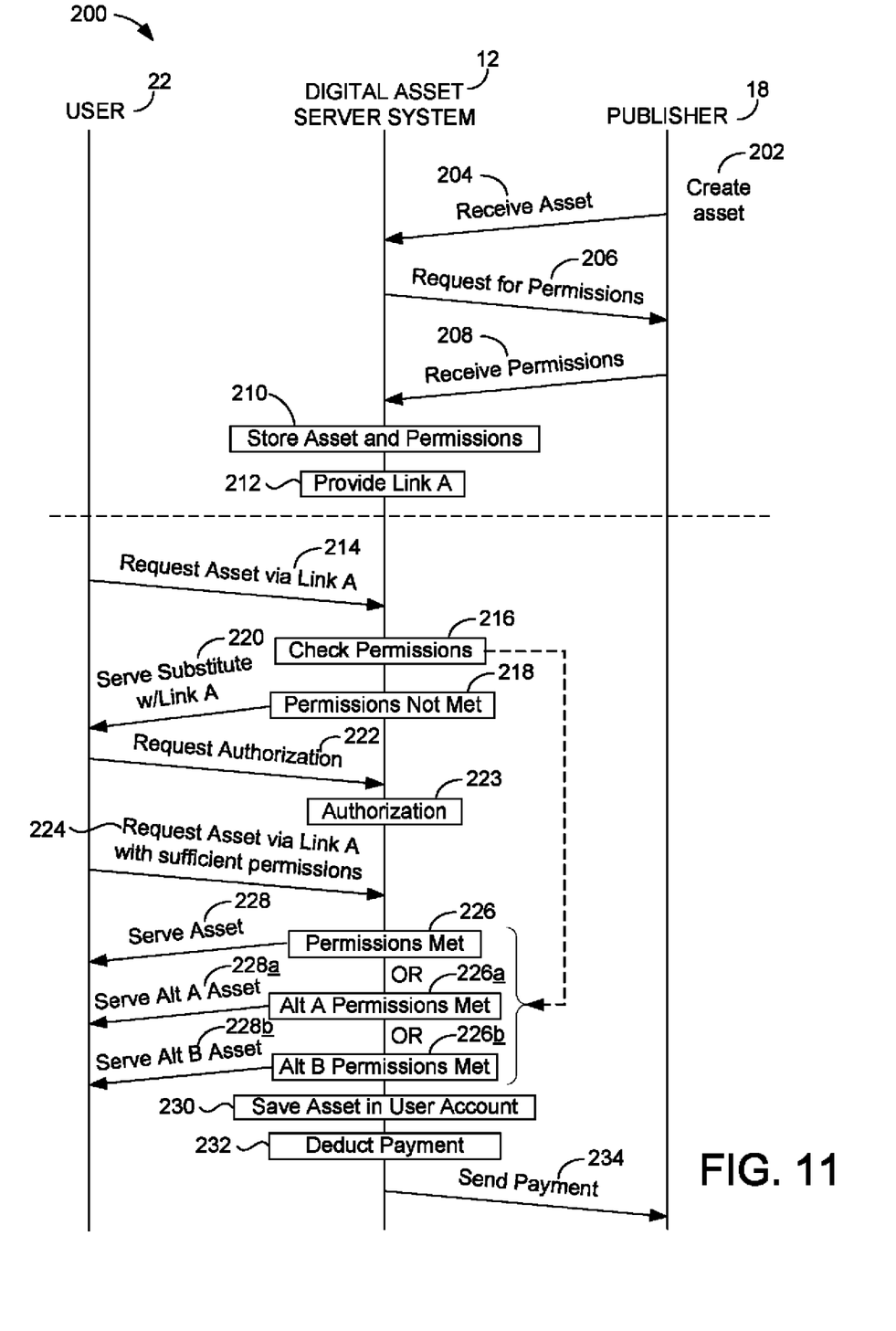
FIG. 11 is a diagram illustrating network communications among a publisher client, the digital asset server system, and a user client of the distribution system of FIG. 1.

FIG. 11 illustrates a process flow of a digital asset distribution method 200, according to one embodiment of the present invention. At 202, a digital asset is created by the publisher 18. As described above, the digital asset may be an original work, or may be a remixed or derivative work.

At 204, the digital asset is received from the publisher at the digital asset server system 12. The asset is typically uploaded via the asset interface server 34 of the digital assert server system 12. While a single upload is illustrated in FIG. 11, it will be appreciated that the method typically includes receiving a digital asset and associated permissions from a plurality of publishers, and, in turn, hosting the digital assets received from each publisher on the digital asset server system 12.

At 206, a request for permissions may be sent from the digital asset server system 12 to the publisher. This may take the form, for example, of serving the licensing permissions interface or access control interface described herein to the user. At 208, the digital asset server system receives one or more permissions from the owner of the asset. These permissions may include, for example, the licensing permissions received via licensing interface 132 shown in FIG. 8 and/or the access control permissions received via access control interface 156 shown in FIG. 9.

At 210, the method includes storing the digital asset and associated permissions on a storage device associated with the digital asset server system 12. Typically the digital asset and permissions are stored on a file system, as described above.

At 212, the method includes providing a link, represented in FIG. 11 as LinkA, configured to be placed on a web page. The link is linked to a mechanism (typically the permissions engine 44 shown in FIG. 2 of the asset server of the digital asset server system 12, as describe above) on the digital asset server system 12 that checks the permissions and accesses the asset.

At 214, the method includes receiving a request to access the digital asset from a user traversing the link. Typically the link is provided on a web page. It will also be appreciated that the link may be placed in an email, application file, such as a word processing document, or other suitable media configured to links.

At 216, the method typically includes determining whether the user is authorized to access the requested digital asset according to the permissions for the digital asset. The block at 218 illustrates the case where the digital asset server system 12 determines the user is not authorized to view the digital asset. Upon determining the user is not authorized to access the digital asset, as illustrated at 220, the method includes displaying a substitute to the user. The substitute typically includes a link to the digital asset server system 12 by which the user may obtain authorization to download the digital asset, represented in the FIG. 11 as Link A.

At 222, the digital asset server system 12 receives a user request for authorization to access the asset. Typically, this request is received as follows. The user selects Link A in the substitute, and the user is presented with an authorization interface, such as described above at 58. Or, alternatively, the authorization interface may be embedded in the substitute, and the user may make the selection directly from the substitute.

At 223, the digital asset server system 12 authorizes the user. This typically involves verifying the user has sufficient funds to make the purchase, or verifying the user has performed the action requested by the licensee or sponsor for access, such as viewing an advertisement, visiting a website, visiting a website and/or creating an account, etc.

Once authorization has been completed, a message may be presented to the user stating that authorization is complete. As shown at 224, the user may once again traverse Link A, with sufficient permissions to access the asset. This time, even though Link A has not changed, the digital asset server system 12, at 226, checks the user account against the permissions for the asset and determines that the permissions are met and that the user is authorized to access the asset. At 228, the method includes serving the asset to the user. If the user has set permissions that include serving one or more alternative digital assets to specified users and groups, for example, using alternative asset selector tool 165 or blacklist alternative asset selector 164, then as shown at 226a and 226b the method may include determining that the one of an alternative set of permissions are met for an alternative asset (indicated as Alt A and Alt B in FIG. 11), and at 228a and 228b, the method may include serving the appropriate alternative asset for which the permissions are met.

At 230, the purchased asset is stored in the user account on the digital asset server system 12. At 232, if the transaction is a money transaction, the price is debited against the user's account. Alternatively, the price may be charged to a user credit account. It will be appreciated that debiting or charging of payment may alternatively occur prior to delivery of the asset to the user account, for example, during authorization at 223. Finally, at 234, the method may include distributing at least a portion of the payment to the publisher of the digital asset.

Figure 12:
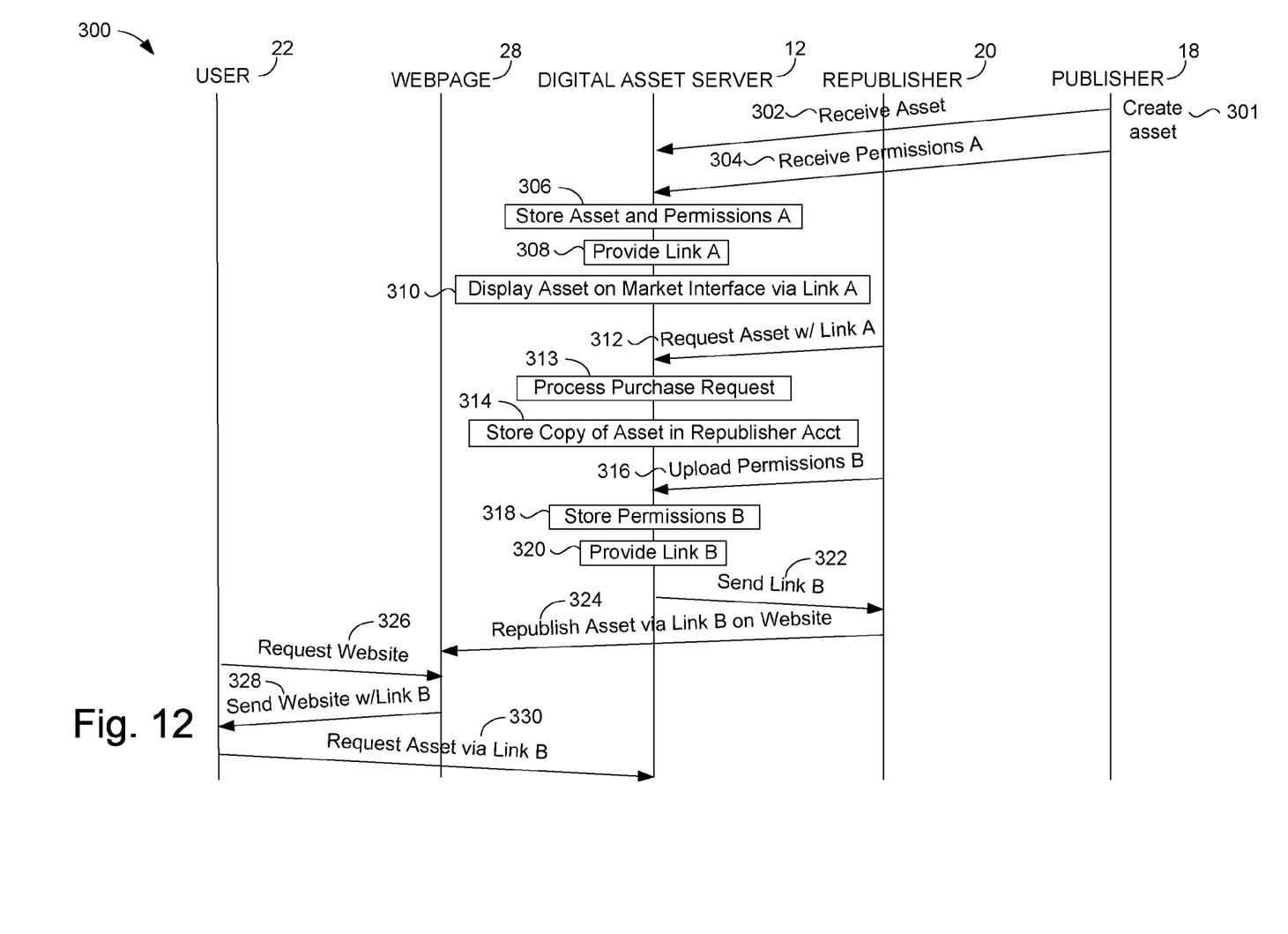
FIG. 12 is a diagram illustrating network communications among a publisher client, a republisher client, the digital asset server system, a third party website, and a user client of the distribution system of FIG. 1.

FIG. 12 illustrates a process flow of a digital asset distribution method 300, according to another embodiment of the present invention. At 301, a digital asset is created by the publisher 18. At 302, the digital asset is received by the digital asset server system 12, after being uploaded from the publisher 18. At 304, permissions associated with the digital asset are received by the digital asset server system 12. Typically these permissions are entered via the digital asset server website 35 shown in FIG. 2, and may include licensing and access control permissions as described above. While FIG. 12 illustrates receiving an asset and permissions from a single publisher, it will be appreciated that the method typically includes receiving a digital asset and associated permissions from each of a plurality of publishers, and, in turn, hosting the digital assets received from each publisher on a digital asset server system 12.

At 306, the method includes storing the digital asset and the permissions on a storage device associated with the digital asset server system 12. At 308, the method includes providing a link A to the digital asset server system 12 by which the user may obtain authorization to download the digital asset. At 310, the method typically includes displaying the asset for distribution on a website, typically the market interface 49 shown in FIG. 2 of the digital asset server system website 35. Alternatively, the asset may be displayed for distribution on a different website, such as the publisher's own website. The asset is typically displayed by placing Link A within the marketplace website. As described above, Link A includes a universal resource locator (URL) that indicates an address on the file system of asset server 42 in FIG. 2. Asset server 42 receives the request, reads a cookie on the user client to determine the user's identity, and, via the permissions engine, determines whether the user is authorized by the permissions associated with the asset to view the asset. If the user is authorized, a private or user-specific preview of the asset may be displayed on the market place. If the user is not authorized to view the asset, then the public preview may be displayed, as described above.

At 312, the method typically includes receiving at the digital asset server system 12 a request for purchase of the digital asset from a republisher 20. Typically, the request is initiated by the republisher by traversing Link A on the marketplace interface 49 in FIG. 2 of website 35. At 313, the method includes processing the purchase request, typically by verifying that the republisher is authorized by permissions to download the asset, serving the asset to the republisher, and negotiating payment, similar to steps 216, 226-234 of FIG. 11. At 314, the method may include storing the digital asset in the republisher's account.

At 316, the method includes receiving republisher permissions for the redistribution of the digital asset from the republisher. At 318, these republisher permissions are stored in the republisher account in a manner associated with the digital asset. At 320, the method includes providing a second link (link B, also referred to as a republisher's link), by which the digital asset may be accessed, according to the republisher permissions. At 322, link B is transmitted to the republisher.

It will be appreciated that where the republisher does not alter the digital asset itself, Link A and B may both point to the same digital asset on the digital asset server system 12; however, Links A and B typically point to different copies of the asset, one in the publisher's account and associated with publisher permissions (A) and the other in the republisher's account and associated with republisher permissions (B). Alternatively, the republisher may remix the digital asset and create a derivative work based thereon, which is not the same as the underlying digital asset, but which is nonetheless subject to licensing as a derivative work of the underlying asset. In this case, Link A points to the original asset with the associated publisher permissions, and Link B points to the modified or remixed asset with the associated republisher permissions.

As illustrated at 324, the republisher may republish the asset on a third party webpage 28, by inserting link B into the website. As shown at 326-328, a user may request to download and display the webpage 28 (including link B) on the user client, and in response, the third party web server may respond by serving the webpage (including link B) to the user client.

At 330, the method further includes receiving a request from the user for the digital asset, as republished by the republisher. The request is typically made by a user's selection of Link B on the third party webpage, and is, in turn, received by the digital asset server system 12.

Figure 13:
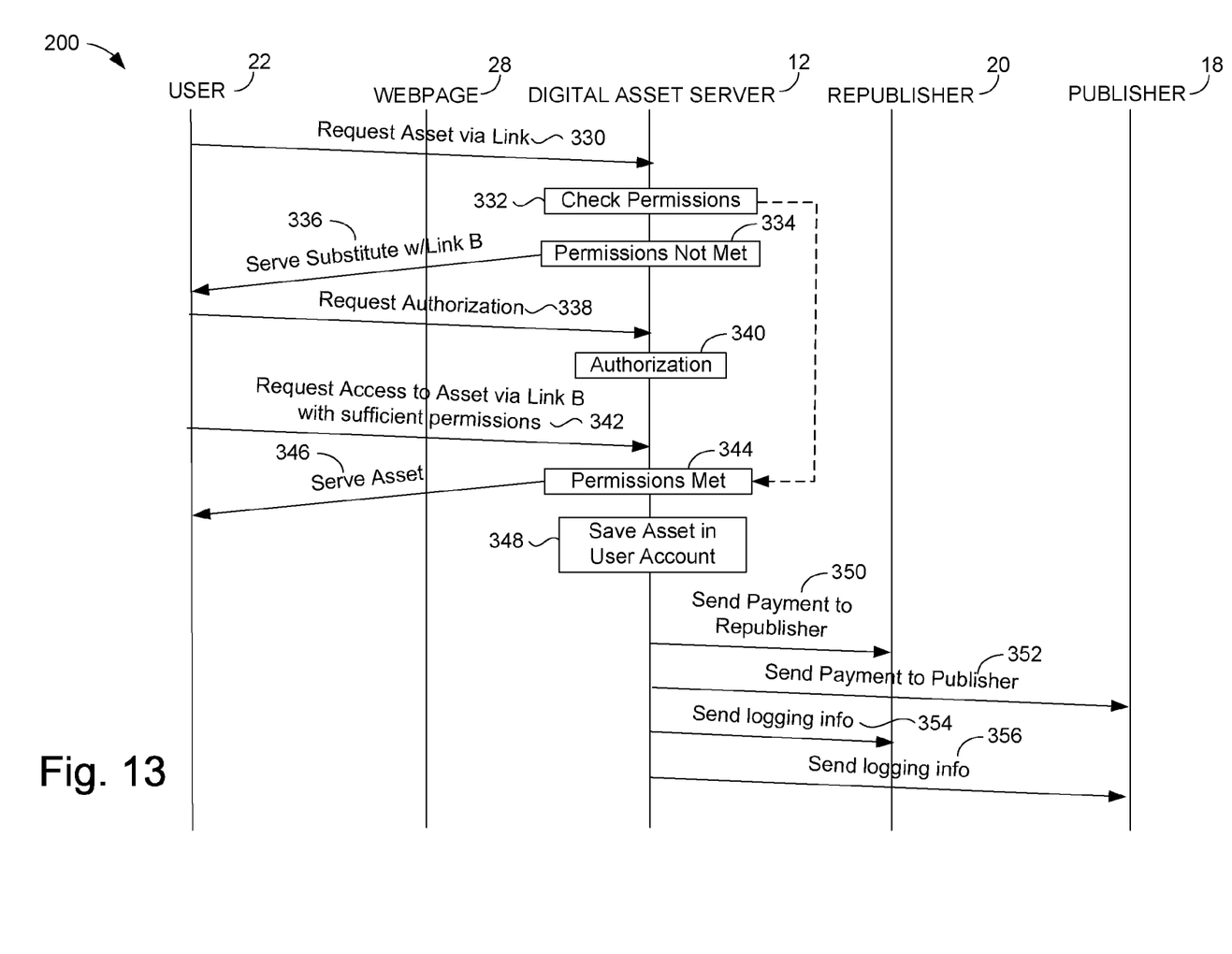
FIG. 13 is a continuation of the diagram of FIG. 12.

Continuing to FIG. 13, at 332 the method further includes checking the permissions associated with the asset to determine whether the user is authorized to view the asset. If the user is authorized, the method proceeds to 344, as described below.

If, on the other hand, at 334 the digital asset server system 12 determines the permissions are not met and the user is not authorized to access the asset, then at 334 the method includes serving a substitute with Link B to the user client. At 336, the method may include receiving a request from the user, via link B, for authorization to access the asset. At 338, the method may include authorizing the user to access the asset. This typically is accomplished by the user purchasing the asset for a monetary price or action, etc. as described above. Once authorization is complete, the method may further include receiving a request from the user to access the asset, with the user now possessing sufficient permissions. Thus, at 344, the method checks and determines that the user has sufficient permissions to view the asset. At 346, the method includes serving the asset to the user. As shown at 348, a copy of the asset is saved in the user account on the digital asset server system 12.

In the case of a money transaction, at 350, a portion of payment received from the sale of the asset to the user may be distributed to the republisher, and, at 352, a portion of the payment received from the sale of the asset may be distributed to the publisher. The amount to be distributed to the publisher and republisher may be defined by the publisher, for example, via redistribution selector 146, described above in reference to FIG. 8.

Finally, at 354 and 356, the method may include sending logging information regarding the transaction to each of the republisher and publisher, so that they may keep accurate records.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A digital asset distribution method, comprising:
    at a digital asset server system, receiving a digital asset and associated permissions from each of a plurality of publishers, where the associated permissions include specifications of one or more user groups;
    hosting the digital assets received from each publisher on the digital asset server system;
    at the digital asset server system, receiving a request from a user to access a requested digital asset via the digital asset server system via a link in a web page published by a publisher of an asset;
    determining whether the user is authorized to access the requested digital asset according to the permissions for the digital asset;
    if the user is not authorized to access the requested digital asset, determining whether the user is authorized to access an alternative digital asset;
    if the user it not authorized to access the requested digital asset or the alternative digital asset, displaying a substitute to the user, wherein the substitute depends on user groups to which the user belongs, and wherein the substitute includes a link to the digital asset server system by which the user may obtain authorization to download the digital asset;
    if the user is authorized to access the requested digital asset, saving the requested digital asset in a user account and displaying the requested digital asset; and
    if the user is authorized to access the alternative digital asset, saving the alternative digital asset in a user account and displaying the alternative digital asset.

2. The method of claim 1, further comprising, providing a link to the digital asset on the digital assert server system, which may be embedded in a third party website.

3. The method of claim 1, further comprising, once the user is authorized, displaying the asset to the user.

4. The method of claim 1, wherein the substitute includes a preview of the asset.

5. The method of claim 1, wherein the substitute includes file information of the asset.

6. The method of claim 1, wherein the substitute includes purchase statistics for the asset.

7. The method of claim 1, wherein the substitute includes user feedback information for the asset.

8. The method of claim 1, wherein the substitute includes pricing information for the asset.

9. The method of claim 1, wherein the substitute includes user account information.

10. The method of claim 9, wherein the user account information includes user account balance.

11. The method of claim 1, wherein the substitute includes an indication of whether the asset meets preset selection criteria set by the user.

12. The method of claim 1, wherein the substitute includes a link to purchase all assets displayed on a web page.

13. The method of claim 1, wherein the substitute is an image of substantially the same size as the requested digital asset.

14. The method of claim 1, wherein the asset is downloaded and the substitute is overlayed over the asset to at least partially cover the asset.

15. The method of claim 14, wherein the substitute is at least partially translucent.

16. The method of claim 14, further comprising, once the user is authorized to view the asset, removing the substitute to reveal the asset.

17. The method of claim 1, wherein the publisher is a republisher of the asset who owns the right to republish the asset.

18. The method of claim 1, further comprising, receiving payment from the user for access to the digital asset.

19. The method of claim 18, further comprising, distributing at least a portion of the payment to the publisher of the digital asset.

20. The method of claim 1, wherein the permissions include pricing and redistribution rights.

21. A digital asset distribution method, comprising:
- at a digital asset server system, receiving a first digital asset and a second digital asset from publishers of the first and second digital assets;
- receiving one or more access permissions from owners of the first and second digital assets, the access permissions including one or more user groups permitted to receive the first and second digital assets;
- storing the first and second digital assets and associated permissions on a database associated with the digital asset server system;
- providing a link to be placed in a web page, linking to a mechanism on the digital asset server system for checking the permissions and accessing the first and second digital assets;
- receiving a request to access the first digital asset from a user traversing the link;
- determining whether the user may access the first digital asset;
- if the user is authorized to access the first digital asset, serving the first digital asset to the user, saving the first digital asset in a user account, and displaying the first digital asset;
- if the user is not authorized to access the first digital asset, determining whether the user may access the second digital asset;
- if the user is authorized to access the second digital asset, serving the second digital asset to the user, saving the second digital asset in a user account, and displaying the second digital asset; and
- if the user is not authorized to access the first or second digital asset, serving a substitute to the user, the substitute depending on user groups to which the user belongs, the substitute including a mechanism for obtaining authorization to access one of the first and second digital assets.

* * * * *